United States Patent [19]

Suzuki et al.

[11] Patent Number: 4,499,126
[45] Date of Patent: Feb. 12, 1985

[54] PLASTIC RELIEF CARD HAVING METALLIC LUSTER

[75] Inventors: Norimoto Suzuki, Tokyo; Shunji Inoue, Yokohama, both of Japan

[73] Assignee: Dai Nippon Insatsu Kabushiki Kaisha, Japan

[21] Appl. No.: 493,518

[22] Filed: May 11, 1983

[51] Int. Cl.³ .................... G09F 3/02; G03C 11/08
[52] U.S. Cl. .................................. 428/13; 156/209; 156/272.2; 283/74; 283/82; 283/94; 283/107; 428/172; 428/204; 428/207
[58] Field of Search ............... 428/13, 172, 204, 207, 428/208, 913, 915, 328, 329; 283/75, 82, 94, 98, 107, 108, 109, 110, 111, 904, 74; 427/7; 40/2 R; 156/272.2, 209

[56] References Cited

U.S. PATENT DOCUMENTS

| | | | |
|---|---|---|---|
| 3,725,184 | 4/1973 | Scopp | 283/904 |
| 3,821,060 | 6/1974 | Braca et al. | 283/904 |
| 3,897,964 | 8/1975 | Oka et al. | 283/904 |
| 4,096,015 | 6/1978 | Kawamata et al. | 283/109 |

Primary Examiner—Paul J. Thibodeau
Attorney, Agent, or Firm—Parkhurst & Oliff

[57] ABSTRACT

A plastic card having a metallic luster and a relief pattern comprises a pair of metal-luster plastic sheets containing a metal-luster pigment, a colored plastic sheet provided between the metal-luster sheets, a printed ink layer provided on the outer surface of one of the metal-luster sheets, and transparent plastic sheets respectively laminated on the outer surfaces of the metal-luster sheets, a relief pattern of concavities and convexities of a shape corresponding to the printed ink layer being formed on the surface of the metal-luster sheet opposite that on which the printed ink layer is provided. A magnetic stripe may be further provided on an outer surface of the card.

13 Claims, 4 Drawing Figures

PLASTIC RELIEF CARD HAVING METALLIC LUSTER

BACKGROUND OF THE INVENTION

This invention relates to a plastic relief card having metallic luster.

In these days, an extremely great number of plastic cards as exemplified by identification cards, bank cards, membership cards, credit cards, etc., are being utilized. These cards are used as they are, or they are constituted to function as magnetic cards on which various kinds of information are recorded by magnetic recording methods.

In recent years, as an improvement of the above mentioned cards, a number of cards of beautiful exterior appearance having metallic luster have been proposed. One card of this type disclosed in the prior art has a structure comprising a metallic lustrous sheet prepared by dispersing a metal-luster pigment in a plastic sheet and forming thereon by printing a pattern, characters, or the like and, thereafter laminated thereon, a transparent plastic sheet. Furthermore, in the specification of copending U.S. patent application Ser. No. 398,874, there is disclosed a plastic card of beautiful exterior appearance in which a metal-luster plastic sheet containing a metal-luster pigment is laminated on each of the two surfaces of a plastic sheet of black color, grey color, or a chromatic color, and a transparent plastic sheet is laminated onto each of the outer surfaces of these metal-luster plastic sheets.

In these cards, however, a metallic luster cannot be obtained in the printed portion, and, consequently, characters and like printed marks are disadvantageously limited to flat designs as perceived by visual sensation.

SUMMARY OF THE INVENTION

It is an object of this invention to provide a plastic relief card having metallic luster in which the above described problem of the prior art has been overcome.

As a result of research directed toward the achievement of the above stated object, it has been discovered that, by providing a pattern of surface concavities and convexities (hereinafter referred to as a "relief pattern") on at least one surface of a metal-luster sheet and laminating a transparent plastic sheet onto that surface, a plastic relief card in which a pattern, characters, or the like appear to be emerging or floating upward in a three-dimensional manner, and which has good metallic luster can be obtained. At the same time, this plastic relief card was successfully developed to constitute this invention.

According to this invention, briefly summarized, there is provided a plastic relief card characterized by its structure wherein transparent plastic sheet are laminated respectively on the outer surfaces of at least one metal-luster plastic sheet containing a metal-luster pigment and having on at least one surface thereof a relief pattern of surface concavities and convexities.

The nature, utility, and further features of this invention will be more clearly apparent from the following detailed description with respect to preferred embodiments of the invention when read in conjunction with the accompanying drawing.

DETAILED DESCRIPTION OF THE INVENTION

Figure 1:
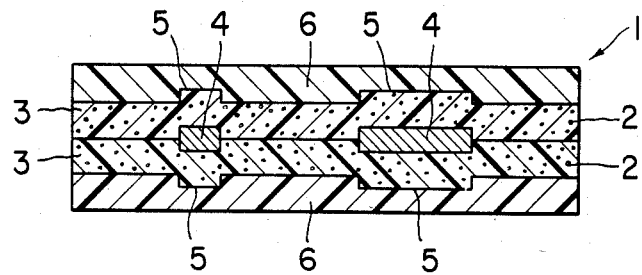
FIGS. 1 through 4 are sectional views taken in planes parallel to the thickness direction respectively of different embodiments of the invention.

In one embodiment of this invention as shown in FIG. 1, the relief card 1 comprises two metal-luster plastic sheets 3, 3 containing a metal-luster pigment 2, a printed ink layer 4 formed between the plastic sheets 3,3, which have on their outer surfaces relief patterns 5,5 of shapes corresponding to the printed ink layer 4, and transparent plastic sheets 6,6 respectively laminated onto the outer surfaces of the metal-luster plastic sheets. The thickness of the card as a whole is generally of the order of 0.7 to 0.8 mm.

The base resin materials constituting the colored plastic sheet 1, the metal luster plastic sheets 3,3 and the transparent plastic sheets 6 may be either the same or different, and can be selected from such materials as polyvinyl chloride, polyethylene, polypropylene, polyester, polystyrene, and polycarbonate. It is desirable to use a material with good transparency.

The metal-luster plastic sheets can be obtained by kneading the metal-luster pigment with the above described resin under heating and thereafter forming the resultant mixture into sheets by rolling, etc. The metal-luster pigment, can include for example, lead-based compounds such as basic lead carbonate, acidic lead arsenate; bismuth-based compounds such as bismuth oxychloride; mica-based pigments comprising mica flakes or mica flakes coated with titanium oxide; metal powders such as aluminum or brass; and fish scales may be used. These metal-luster pigments generally comprise particles of greater size than the coloration pigments which produce the colored plastic sheet 2 and are poorly dispersible in the resin. These metal-luster pigments are used generally in a range of from 1.0 to 10 parts based on 100 parts of the resin. In the case where a plastic card 1 with a thickness of 0.7 to 0.8 mm is to be obtained, metal-luster plastic sheets 3 each of a thickness of the order of 0.1 to 0.3 mm are used.

The printed ink layer 4 is used for forming (by methods as described hereinafter) the relief patterns 5,5 on the outer surfaces of the metal-luster sheets 3,3 and is printed by a method such as silk-screen printing or offset printing. For the ink used here, ordinary ink can be used; in the above described example, either transparent ink or opaque ink can be used.

Each relief pattern 5 is formed to be of a shape corresponding to that of the printed ink layer 4 and represents a figure, character, pattern, or the like.

The transparent plastic sheets can be prepared by forming the resin as described above into sheets and are of a thickness of approximately 0.1 to 0.2 mm in a plastic relief card of 0.7- to 0.8-mm thickness.

In the fabrication of the plastic relief card 1 of this invention, the printed ink layer 4 is first formed on one surface of a metal-luster plastic sheet 3, and thereafter the other metal-luster plastic sheet 3 is laminated onto the side of the printed ink layer 4. The transparent plastic sheets 6,6 are then respectively laminated on the outer surfaces of the two metal-luster plastic sheets 3,3 thus laminated together. Thereafter, by applying heat and pressure to the outer faces of the transparent plastic sheets 6,6 to cause bonding, a plastic relief card 1 is obtained. At the time of this pressure bonding, parts of the metal-luster plastic cards 3,3 in contact with the printed ink layer 4 are pressed by the ink layer 4 and thus protrude outward to produce relief patterns 5 corresponding in shape to the printed ink layer 4 on the outer sides of the metal-luster plastic sheets 3,3.

Figure 2:
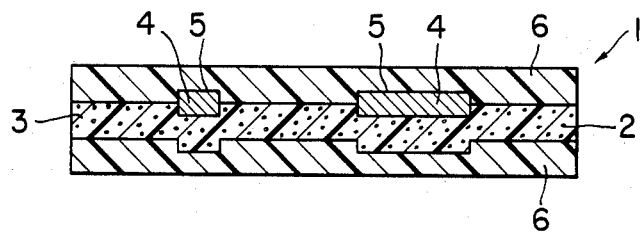

In another embodiment of this invention as shown in FIG. 2, the plastic relief card 1 has a printed ink layer 4 which is formed between a metal-luster plastic sheet 3 and a transparent plastic sheet 6. As a result of bonding by applying heat and pressure to fabricate the relief card in a manner similar to the preceding example, the printed ink layer 4 presses against the metal-luster plastic sheet 3 to cause a relief pattern 5 to be formed. In this example, in the case where the printed ink layer 4 is opaque, it appears, and for this reason it is necessary to use a transparent ink.

Figure 3:
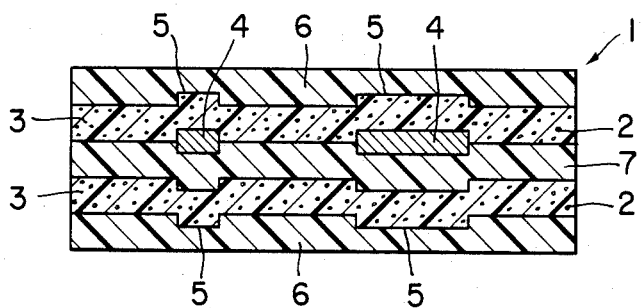

In still another embodiment of this invention as illustrated in FIG. 3, the metallic luster is further enhanced by the provision of a colored plastic sheet 7. In this plastic relief card 1, metal-luster plastic sheets 3,3 are laminated respectively on the opposite surfaces of the colored plastic sheet 7, and transparent plastic sheets 6,6 are laminated respectively on the outer surfaces of the metal-luster plastic sheets 3,3. A printed ink layer 4 is formed between the colored plastic sheet 7 and one of the metal-luster plastic sheets 3, and relief patterns 5,5 are formed thereby on the outer surfaces of the metal-luster plastic sheets 3,3.

Here, the material of the colored plastic sheet 7 may be the same as or different from that of the metal-luster plastic sheets 3,3, and synthetic resins such as the examples enumerated hereinbefore can be used.

The colored plastic sheet 7 may be prepared by kneading a coloration pigment with the aforesaid resin under heating, and then by rolling or other treatment to form a sheet having a smooth surface. In the present invention, for imparting good metal luster to the resultant card by combination with the metal-luster plastic sheets 3, the colored plastic sheet 7 is required to have a color which is relatively deep, preferably having a lightness in the range of from 0 to 3 according to the Munsell color system. For the purpose of providing a plastic card whose optical reading or positional detection can be readily carried out, it is desirable that the colored plastic sheet have an optical transmission density of 1.8 or more.

As a coloration pigment, any of the pigments selected from those which can give the above density, including, for example, black pigments such as carbon black, lamp black, and diamond black; grey pigments obtained by dilution of these black pigments with white pigments such as titanium white; and chromatic color pigments such as phthalocyanine blue, Watchung red, and titanium yellow may be employed. Such a pigment may be used in a quantity generally in the range of 0.5 to 15 parts based on 100 parts of the plastic, but a black pigment is used in a quantity of 0.5 to 5 parts, a grey pigment (prepared by dilution of a black pigment with, for example, 10- to 20-fold quantity of white pigment) in a quantity of about 5 to 15 parts. Thus, a black pigment is most preferable since it can give a deep colored plastic sheet with a small amount and can also produce a homogeneous and good metal luster by the combination with the metallic luster sheets 3. The colored plastic sheet 7 has a thickness which may freely be selected within the range to give the above density, but which is generally 0.1 to 0.4 mm when producing a plastic card with a thickness of about 0.7 to 0.8 mm.

Figure 4:
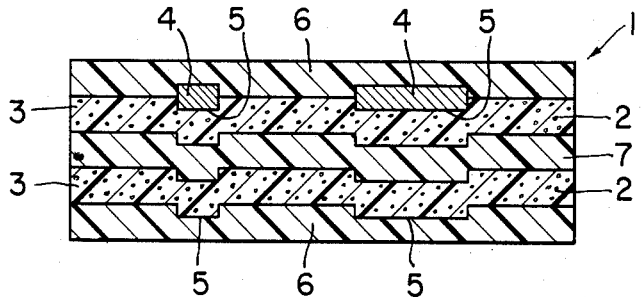

In a further embodiment of this invention as shown in FIG. 4, the plastic relief card 1 has a printed ink layer 4 interposed between one of the metal-luster plastic sheets 3 and the adjacent transparent plastic sheet 6. In all other respects, this plastic relief card 1 is the same as that of the preceding example illustrated in FIG. 3 and has similar effective characteristics.

While this invention has been described above with respect to the case wherein a printed ink layer is used as means for forming a relief pattern in the metal-luster plastic sheet, it is also possible to form the relief pattern by other measures such as forming by means of an ordinary press or forming the relief pattern by adhesively bonding a transparent film in the shape of the desired pattern, characters, or the like.

The plastic relief card of this invention can be utilized for identification cards, membership cards, credit cards, etc. However, the most attractive use of the plastic relief card of this invention is that as a magnetic card. In this case, a magnetic recording layer in the shape of, for example, a stripe, comprising magnetic powder such as $\gamma$-$Fe_2O_3$ dispersed in a thermoplastic or thermosetting resin binder is formed on or embedded in at least one of the transparent plastic sheets 6.

As described above, the plastic relief card according to this invention has a structure wherein, on the opposite surfaces of at least one metal-luster plastic sheet having a relief pattern formed on at least one surface thereof, transparent plastic sheets are laminated, and the relief pattern, characters, or the like appear to be emerging or floating three-dimensionally upward. Furthermore, since the pattern is formed on the metal luster plastic sheet itself, the metallic luster is not impaired by the other parts of the card. As a net result, the plastic relief card according to the invention can be made to have an esthetically beautiful exterior appearance and yet have great utility and practical value.

In order to indicate more fully the nature and utility of this invention in concrete detail, the following specific examples of practice thereof are set forth, it being understood that these examples are presented as illustrative only and are not intended to limit the scope of the invention.

EXAMPLE 1

On a black plastic sheet of 0.1-mm thickness, a printed ink layer was formed by silk-screen printing with 150 mesh, resist film thickness of 25 to 50 microns, and ink build-up of 13 to 25 microns with the use of a black ink and drying the printed ink. The black ink was of the following composition.

|  | % by weight |
|---|---|
| Cellosolve acetate | 17 |
| cyclohexanone | 28 |
| solvesso #100 (mfd. by Esso Co.) | 24 |
| vinyl chloride-vinyl acetate copolymer resin | 25 |
| carbon black | 6 |

Then, on each of the two surfaces of the black plastic sheet, a metal luster polyvinyl chloride sheet of 0.23-mm thickness and a transparent polyvinyl chloride sheet of 0.1-mm thickness were successively laminated. The laminated structure thus obtained was subjected to heat and pressure for bonding, whereupon a plastic relief card having a good metallic luster was obtained.

EXAMPLE 2

On a metal-luster polyvinyl chloride sheet of a thickness of 0.23 mm, a printed ink layer was formed by carrying out silk-screen printing under conditions similar to those of the preceding Example 1 and with the use of a transparent ink composed of

|  | % by weight |
|---|---|
| Cellosolve acetate | 13 |
| cyclohexanone | 32 |
| solvesso #100 | 30 |
| vinyl chloride-vinyl acetate copolymer resin | 25 | and drying the ink. Then, on one surface of this metal-luster polyvinyl chloride sheet, a metal-luster polyvinyl chloride sheet of a 0.23-mm thickness was laminated. Thereafter, on the two surfaces of the resulting laminated structure, transparent polyvinyl chloride sheets each of 0.1-mm thickness were respectively laminated to form a laminated structure, which was bonded together by heating and pressing, whereupon of plastic relief card having good metallic luster was obtained.

What is claimed is:

1. A plastic card having metallic luster relief appearances comprising at least one metallic luster plastic sheet containing a metallic-luster pigment and having a relief pattern of surface concavities and convexities formed on the surface thereof and transparent plastic sheets respectively laminated onto the outer surfaces of the metallic-luster plastic sheet.

2. A plastic card having metallic luster relief appearances comprising a pair of metallic-luster plastic sheets containing a metallic-luster pigment, a printed ink layer provided between the metallic-luster plastic sheets, and transparent plastic sheets respectively laminated on the outer surfaces of the metallic-luster plastic sheets, a relief pattern of concavities and convexities of a shape corresponding to that of the printed ink layer being formed on the outer surfaces of the metallic-luster plastic sheets.

3. A plastic card according to claim 2 further comprising a colored plastic sheet interposed between the pair of metallic-luster plastic sheets.

4. A plastic card according to claim 3 in which the colored plastic sheet is of black color or grey color.

5. A plastic card according to claim 3 in which the colored plastic sheet is of a chromatic color.

6. A plastic card according to claim 2 in which a magnetic layer is provided on at least one outer surface of at least one of the transparent plastic sheets.

7. A plastic card according to claim 2 in which a magnetic layer is embedded in at least one surface of at least one of the transparent plastic sheets, and the outer surface of the magnetic layer and the outer surface of said transparent plastic sheet lie in one and the same plane.

8. A plastic relief card having metallic luster relief appearances comprising a pair of metallic-luster plastic sheets containing a metallic-luster pigment, a colored plastic sheet provided between the metallic-luster plastic sheets, a printed ink layer provided on the outer surface of one of the metallic-luster plastic sheets, and transparent plastic sheets respectively laminated on the outer surfaces of the metallic-luster plastic sheets, a relief pattern of concavities and convexities of a shape corresponding to the printed ink layer being formed on the surface of said metallic-luster plastic sheet opposite the surface of the printed ink layer.

9. A plastic card according to claim 8 in which the colored plastic sheet is of black color or grey color.

10. A plastic card according to claim 8 in which the colored plastic sheet is of chromatic color.

11. A plastic card according to claim 8 in which a magnetic layer is provided on at least one outer surface of at least one transparent plastic sheet.

12. A plastic card according to claim 8 in which a magnetic layer is embedded in at least one surface of at least one transparent plastic sheet, and the outer surface of said magnetic layer and the outer surface of said transparent plastic sheet lie in one and the same plane.

13. A method for fabricating a plastic card according to claim 1 which process comprises forming a printed ink layer on the metallic-luster plastic sheet, laminating the transparent plastic sheets respectively onto the two surfaces of the metallic-luster plastic sheet on which the printed ink layer has been formed, and thereafter applying heat and pressure for bonding to opposite faces of laminated structure thus obtained, said heat and pressure forming a relief pattern of surface concavities and convexities conforming to the printed ink layer on the metallic-luster sheet.

* * * * *